US007043446B1

(12) United States Patent
Dietrich et al.

(10) Patent No.: US 7,043,446 B1
(45) Date of Patent: May 9, 2006

(54) METHOD FOR DETERMINING THE SET OF WINNING BIDS IN A COMBINATORIAL AUCTION

(75) Inventors: Brenda Lynn Dietrich, Yorktown Heights, NY (US); John Joseph Forrest, Peekskill, NY (US)

(73) Assignee: International Business Machines Corporation, Armonk, NY (US)

( * ) Notice: Subject to any disclaimer, the term of this patent is extended or adjusted under 35 U.S.C. 154(b) by 866 days.

(21) Appl. No.: 09/626,946

(22) Filed: Jul. 27, 2000

(51) Int. Cl.
*G06F 17/60* (2006.01)

(52) U.S. Cl. .............................. 705/26; 705/37; 705/27; 705/8

(58) Field of Classification Search ................... 705/26, 705/27, 37, 8; 364/407; 706/62; 379/221.01
See application file for complete search history.

(56) References Cited

U.S. PATENT DOCUMENTS

| | | | | |
|---|---|---|---|---|
| 5,270,921 A | * | 12/1993 | Hornick | 364/407 |
| 5,615,254 A | * | 3/1997 | Qiu et al. | 379/221.01 |
| 5,905,975 A | * | 5/1999 | Ausubel | 705/37 |
| 6,263,315 B1 | * | 7/2001 | Talluri | 705/8 |
| 6,272,473 B1 | * | 8/2001 | Sandholm | 705/37 |
| 6,272,483 B1 | * | 8/2001 | Joslin | 706/62 |
| 6,324,519 B1 | * | 11/2001 | Eldering | 705/14 |
| 6,374,227 B1 | * | 4/2002 | Ye | 705/8 |
| 6,606,607 B1 | * | 8/2003 | Martin | 705/37 |
| 6,718,312 B1 | * | 4/2004 | McAfee et al. | 705/37 |
| 2002/0016760 A1 | * | 2/2002 | Pathak | 705/37 |

FOREIGN PATENT DOCUMENTS

WO    WO 99/63461    * 12/1999

OTHER PUBLICATIONS

Trick, Michael A; "A Tutorial on Integer Programming" Sun Jun. 14, 1998 extracted from askforJeeves.com web site on Apr. 21, 2005.*
Degraeve et al.; "Optimal Integer solutions to Industrial Cutting Stock Problems"; Informs Journal on Computing; Linthicum; 1999 extracted from Proquest database on Internet on Apr. 21, 2005.*

(Continued)

*Primary Examiner*—Yogesh C. Garg
(74) *Attorney, Agent, or Firm*—McGinn IP Law Group, PLLC; Stephen C. Kaufman, Esq.

(57) ABSTRACT

A method for determining the set of winning bids in a combinatorial auction. Two variants of the method are disclosed. The first method is appropriate when the number of players and the number of combinations of items that are bid on by an individual player are relatively small. The second method is applicable when either of these values becomes large.

20 Claims, 5 Drawing Sheets

OTHER PUBLICATIONS

Zhi-Long, et al. ; "A column generation based decomposition algorithm for a parallel machine just-in-time scheduling problem", European Journal of Operations Research; Amsterdam; Jul. 1, 1999 extracted from Proquest database on Internet on Apr. 21, 2005.*

Rothkopf et al. ( DIMACS Technical Report 95-09; Apr. 1995; "Computationally Manageable Combinatorial Auctions"); hereinafter referred to DIMACS.*

Pekec et al. ( "Making the FCC's First Combinatorial Auction Work Well", Report No. AUC-00-31-G [Auction No. 31]), hereinafter referred to Pekec.*

Barnhart et al; "Branch-And-Price: Column Generation for Solving Huge Integer Programs"; Operations Research; vol. 46, No. 3, May-Jun. 1998.*

Gamache et al.; "A column generation approach for large scale aircrew rostering problems"; Operations Research; vol. 47; No. 2, Mar.-Apr. 1999.*

* cited by examiner

METHOD FOR DETERMINING THE SET OF WINNING BIDS IN A COMBINATORIAL AUCTION

FIELD OF THE INVENTION

This invention relates to a method for determining the set of winning bids in a combinatorial auction. Two variants of the method are disclosed. The first method is preferred when the number of players and the number of combinations of items that are bid on by an individual player are relatively small. The second method is preferred when either of these values becomes large.

INTRODUCTION TO THE INVENTION

Auctions have been used in the sale of items for many years. Auctions provide a means of making scare items available to a large audience, and of ensuring that the seller receives the maximum revenue for the items. Many forms of auctions exist, including open-cry auctions, silent auctions, ascending bid auctions, and descending bid auctions. With the advent of the Internet and other forms of electronic communications, auctions are becoming increasingly common.

Most auctions are for single items, or for multiple copies of the same item. Auctions for related items are often held simultaneously. There are numerous instances where the value (to a buyer or, in our terminology a player) of a set of items may not equal the sum of the value (to the player) of the individual items. In some cases, the value of a collection of items, such as an airline ticket, a hotel room, and theater tickets, may be higher than the sum of the value of the individual items. In this case, the items (airline ticket, hotel, theater tickets) are said to complement one another. In other cases, the sum of the values of the individual items, such as theater tickets and concert tickets for the same time and date, may be higher than the value of the combination. In this case, the items are said to substitute for one another. Therefore a player, attempting to obtain a collection of items, or to obtain one collection from a of a set of specified collections, through participation in several single item auctions, is faced with a dilemma. She may bid on all the items in her desired collection, and obtain some, but not all, of the items in that collection. Even if the total amount she bids does not exceed her value for the collection, she may end up paying more for the items she receives than she values that subset of the collection. Similarly, if she bids for items that substitute for one another, such as the theater tickets and concert tickets, she may end up with both items, at a cost greater than her value for the pair, even if the amount she bids for each item does not exceed her value for that item.

SUMMARY OF THE INVENTION

Therefore, it is evident that there is a need for combinatorial auctions, in which players can specify bids for collections of items. Combinatorial auctions are beginning to be used. In 2000, the Federal Communications Commission will use a combinatorial auction to sell a set of licenses.

Unfortunately, whereas determining the winner of a single item auction is trivial, even when the auction is held over the Internet with thousands of participating players, determining the winner of a combinatorial auction, even a relatively small combinatorial auction, is far more difficult. For n items, there are $2^n-1$ possible combinations. Of course, it is not expected that every possible combination will be bid on.

However, the problem of finding from among a large set of bids, each for a different combination of items, the set of bids that includes each item at most once is known to be computationally difficult. That is, it is a member of a collection of problems called NP-complete, which means that there are no known computational methods that are guaranteed to solve the problem in a number of computations that is bounded by a polynomial in the size of the input data. In practice, exact solution methods for NP complete problems typically require computation resources that grow very rapidly with the problem size, rendering them impractical for all but the smallest instance of the problem. Michael Rothkopf provides an excellent survey of combinatorial auctions, including a discussion of particular forms of auctions that can be efficiently solved, in his paper "Computationally Manageable Combinatorial Auctions," published in Management Science, Vol. 44, No 8, August 1998, pp. 1131–1147.

For combinatorial auctions, where bidding is typically either continuous or in rounds, and each player requires information about whether each of his bids is "currently" a winning bid, the set of winning bids must be computed quickly, and re-computed as new bids are added or the value bids are increased. We disclose two related methods for determining the set of winning bids for combinatorial auctions. Both methods can use a well-established technique called "integer programming" and standard commercial software for solving the integer program. The methods are novel inter alia in that they involve a new formulation technique for specifying the integer program to be solved, as well as new techniques for updating the formulation to reflect the addition of new bids or the modification of existing bids.

Accordingly, we now disclose a method for executing a combinatorial auction, the method comprising the steps of:

(1) reading input data comprising:
  (i) items;
  (ii) players bidding on the items; and
  (iii) bids, where each bid specifies the player bidding, the amount bid, and the list of items included in the bid;

(2) generating proposals by utilizing the input data, each said proposal comprising a collection of bids that can be awarded to a player participating in the auction;

(3) selecting a set of proposals such that each item is included in at most one selected proposal; and (4) informing the players bidding on the items of the results in step (3).

Preferably, step (1) comprises reading input data further including at least one type that is specified for each bid, and wherein step (2) proposals are limited to collections of bids from a player that are of the same type, and wherein step (3) the set of selected proposals is limited to sets that include at most one proposal for each player.

Preferably, step (2) comprises generating all possible proposals.

Preferably, the method comprises enabling step (3) by using an integer programming technique.

Preferably, step (3) comprises selecting a set of proposals that maximizes the total value of the bids included in the selected proposals.

BRIEF DESCRIPTION OF THE DRAWING

The invention is illustrated in the accompanying drawing, in which.

DETAILED DESCRIPTION OF THE INVENTION

Figure 1:
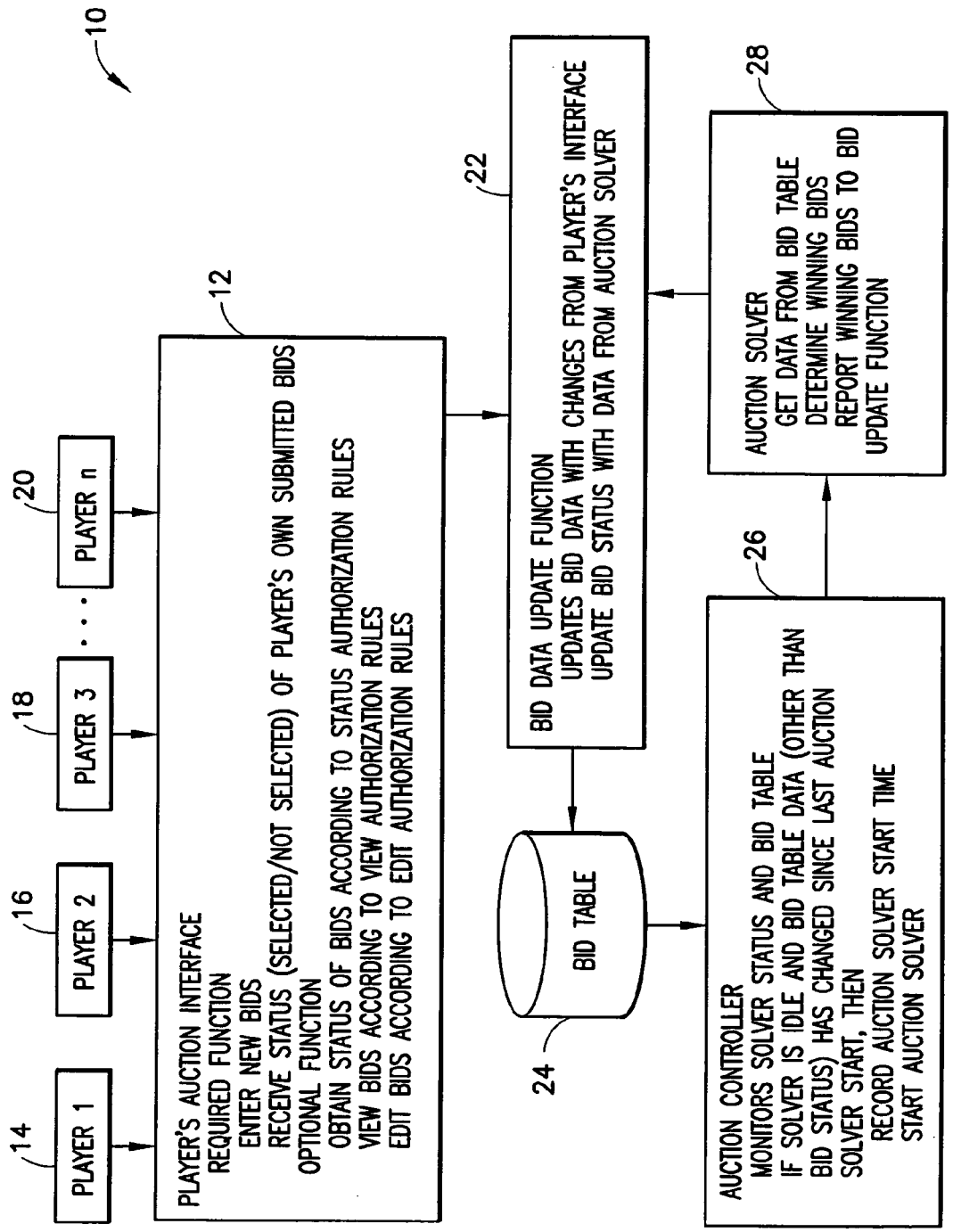
FIG. 1 shows a illustrative system block diagram of the total auction system.

As summarized above, we disclose a method for computing the set of winning bids for a combinatorial auction. We assume that all data describing the current players and bids is available in some electronic form.

Our method preferably supports two forms of combinatorial bidding, conjunctions (ands) and disjunctions (ors). Research in the area of combinatorial bid representation remains active. Noam Nisan provides a discussion of bid representations in his paper, "Bidding and Allocation in Combinatorial Auctions", presented at the 1999 Conference "Northwestern's Summer Workshop in Microeconomics." The representation we have chosen allows a player to limit his total liability while placing bids on an arbitrary number of arbitrary combinations.

Each player can place an arbitrary number of bids. Each bid can contain any combination of items. A bid typically consists of the following data elements: player id, bid value, and items included in the bid.

Each player can also specify a set of bid types, and can assign one or more type to each of his bids. Preference for combinations of items is expressed by placing the items in the same bid. Substitution of bids (that is, the desire to have one, but not both, or a pair of bids) may be expressed by assigning the bids containing the different items different types. A winning combination of bids preferably satisfies the following properties:

(A) each item is included in only one winning bid;
(B) all of the winning bids belonging to a player must be included in a single type.

Furthermore, among all combinations of bids satisfying these two constraints, the winning combination must maximize total revenue.

To understand property (B), note that we allow a bid to be assigned to more than one type. If a player has a bid BID1 that is assigned to type TYPE1, a bid BID2 that is assigned to TYPES and to TYPE2, and a bid BID3 that is assigned to TYPE2, then a winning combination can include BID1 and BID2, because they both belong to TYPE1. A winning combination could also include BID2 and BID3, because they both belong to TYPE2. The pair BID1 and BID3 cannot appear in any winning combination because there is no type that includes both of these bids.

Standard combinatorial auctions as described in Rothkopf's paper correspond to the case where each player assigns all of his bids the same type. Exclusive-or auctions, where each player is allowed to win only one combination, correspond to the case where each player assigns each bid a unique type.

We note that this specification can easily be converted to the case where each bid is allowed to be assigned to only one type, through the use of duplicate bids. In the example above, BID2 would be submitted twice by the player, once assigned TYPE1 and once assigned TYPE2. Allowing multiple types to be assigned to a bid may allow for more compact user interfaces. However our methods are not limited to the case where multiple bid types exist, or to the case where a bid is assigned to multiple types.

We first present a straight forward integer programming formulation of the winning bid selection program. This formulation is an extension, incorporating the type constraint, of the formulation given by Rothkopf.

Let I denote the set of items, P denote the set of players, and B denote the set of bids. For each $k \in B$ let $S_k \subseteq I$ denote the set of items in the bid, $v_k \geq 0$ denote the value of the bid, and $p(k) \in P$ denote the player. We let T denote the set of bid types, and for each player $p \in P$ and each type $t \in T$ we let $B_{p,t}$ denote the set of bids of type t made by player p. Note that, as remarked above, for a pair of types $t' \neq t$, and a player p the sets $B_{p,t}$ and $B_{p,t'}$ need not be disjoint (that is, a bid made by a player can be of more than one type), but that for a pair of players $p' \neq p$ the sets of bids submitted by the players $B_{p,t}$ and $B_{p',t'}$ are disjoint. That is, each bid is associated with one or more types, but with only one player.

To designate whether a bid j is included in the winning combination of bids, we use decision variables $x_j$, each of which must take either the value 0 (indicating that the bid j is not in the winning combination) or the value 1 (indicating that the bid j is in the winning combination). We also introduce additional 0–1 variables to indicate which type of bid is selected for each player. That is for each $p \in P$ and $t \in T$ we let $y_{p,t}$ be 1 if all selected bids of player p are of type t, and 0 otherwise.

The set of winning bids can be determined by solving the following integer program:

$$\text{Max} \sum_{j \in B} v_j x_j$$

$$\text{Subject to} \sum_{j: i \in S_j} x_j \leq 1 \text{ for all } i \in I \quad (1)$$

$$\sum_{t \in T} y_{p,t} \leq 1 \text{ for all } p \in P \quad (2)$$

$$x_j - \sum_{j \in B_{p,t}} y_{p,t} \leq 0 \text{ for all } j \in J \quad (3)$$

$$x_j \in \{0, 1\} \text{ for all } j \in J \quad (4)$$

$$y_{p,t} \in \{0, 1\} \text{ for all } p \in P \text{ and } t \in T \quad (5)$$

Constraint (1) says that each item is in at most one winning bid. If it is required that each item be in exactly one winning bid (that is, that all of the items be sold) then the inequality should be changed to an equality. In this case, if there is an item for which no bids are submitted, the integer program may be infeasible. To prevent infeasibility and to also represent a minimum value for each item, one can include a dummy bid for each individual item. Constraint (2) says that at most one type of bids is selected for each player, and constraint (3) says that if a bid is selected, then for that player one of the types assigned to that bid has been selected. Constraints (4) and (5) enforce integrality on the decision variables. If each player uses only one type of bids, then the y variables for that player are not required and constraints (2), (3) and (5) are deleted. Similarly, if for player p, each type includes at most one bid and each bid has a unique type, then the y variables for player p are not required. We use $B_p$ to designate the bids from player p, delete constraint (3) for player p and replace constraint (2) for player p by the following constraint:

$$\sum_{j \in B_p} x_j \leq 1 \qquad (2')$$

The integer program (1)–(5) is easy to formulate from the auction data. Any integer programming solver (such as the OSL product from IBM or the CPLEX product from ILOG) can be used to solve problems of this form. However, the computation time and the amount of computer memory required to solve even moderate sized auctions with this formulation may be excessive.

We have developed a new formulation for the combinatorial auction problem. This formulation has the advantage that for small to moderate sized problems, much less computation time and computer memory is required to solve the problem. It has the further advantage that for large problems, it is typically not necessary to specify the full optimization problem in order to find the winning combination. A small subset of the problem is specified, it's linear programming (LP) relaxation (defined below) is solved (by well known, efficient computer programs), and the solution of the LP is used to determine which additional parts of the formulation are required. These parts are generated and the revised (slightly larger) LP is solved. This process (solve LP, generate more of the problem) is repeated until it can be mathematically proven that no additional parts of the problem need to be specified. The resulting formulation, which is typically much smaller than the full problem) is then solved by using commercial software packages for integer programming problems. We have evaluated this approach on sample data sets and have verified that it requires far less computer time and memory that the direct formulation that has been previously published.

Rather than consider each bid individually, and use a number of constraints to indicate which combinations of bids can be selected simultaneously, we consider, for each player, the combinations of that player's bids that can be simultaneously accepted. Requirement (A) says that the bids belonging to a player that can be included in a winning combination can have no items in common. Requirement (B) says that the bids belonging to a player that can be included in a winning combination must all be included in a single type. It is straightforward to generate all possible combinations of bids belonging to a single player that can be included in a winning combination of bids. We call such combinations proposals.

Various methods can be used to generate the set of valid proposals. If $B_{p,t}$ contains only a few bids, an enumeration and elimination process is very fast. For each $p \in P$ and $t \in T$ enumerate all subsets of $B_{p,t}$. From this collection of sets of bids, eliminate all sets C such that there exists $j,j' \in C$ with $S_j \cap S_{j'} \neq \emptyset$. Denote the collection of remaining sets of bid by $\Phi_{p,t}$. If, on the other hand, $B_{p,t}$ contains many bids, then the following algorithm can be used to construct $\Phi_{p,t}$. We may assume, by relabeling as necessary, that the bids in $B_{p,t}$ are labeled 1, 2, 3, ..., n. For each positive integer k=1, 2, ..., n, let $\Phi_{p,t}^k$ denote the collection of subsets of {1, 2, 3, ... k} such that if exists $j,j' \in C \in \Phi$, then $S_j \cap S_{j'} = \emptyset$. Note that $\Phi_{p,t}^1 = \{\emptyset, \{1\}\}$ is trivial to construct, and that $$\Phi_{p,t}^k = \Phi_{p,t}^{k-1} \cup \{C \cup \{k\} s.t. C \in \Phi_{p,t}^{k-1} \text{ and } S_k \cap S_i = \emptyset \text{ for all } i \in C\}$$

can be constructed from $$\Phi_{p,t}^{k-1}$$

by copying $$\Phi_{p,t}^{k-1}$$

and determining whether k can be added to each element of $$\Phi_{p,t}^{k-1}.$$

If $C \in \Phi_{p,t}$, then the entire collection of bids in C can be in a winning combination of bids, because by construction, the bids all belong to a single type, and each item is contained in at most one bid. We call each such set C a proposal, because it represents a "proposed" set of bids to be awarded to a player. The amount that player p would pay for the proposal C is denoted $w_C$ and equal to the sum of the value of the bids in C, given by $w_C = \Sigma_{j \in C} v_j$.

If the sets $\Phi_{p,t}$ are computed for each player p and type t, then the winning combination of bids can be determined by selecting at most one proposal for each player, and determining that each item is in at most one selected combination.

We let $\Phi_p = \cup_{t \in T} \Phi_{p,t}$ be the proposals for player $p \in P$ and we let $\Phi = \cup_{p \in P, t \in T} \Phi_{p,t}$ be the set of all proposals. For each $C \in \Phi$ we use 0–1 decision variables $z_C$ which indicates whether the proposal C is selected ($z_C = 1$) or not ($z_C = 0$). We include constraints that allow only one proposal to be selected from each player. However, since the type restrictions are satisfied by all of the generated proposals, we do not need to include constraints to enforce this restriction. Although each proposal is generated so that each item is contained in at most one bid in that proposal, proposals from different players may include the same items. Therefore we require a constraint that ensures that the winning combination of proposals includes each item at most once. We let $\overline{S}_C$ be the set of items in the bids in proposal C, that is, $\overline{S}_C = \cup_{k \in C} S_k$.

The set of winning bids can be determined by solving the following integer program:

$$\text{Max} \sum_{C \in \Phi} w_C z_C$$

$$\text{Subject to} \sum_{C \in \Phi_p} z_C \leq 1 \text{ for all } p \in P \quad (6)$$

$$\sum_{\substack{C \in \Phi \\ i \in S_C}} z_C \leq 1 \text{ for all } i \in I \quad (7)$$

$$z_C \in \{0, 1\} \text{ for all } C \in \Phi \quad (8)$$

Constraint (6) says that at most one proposal from each player is in the winning combination. Constraint (7) says that each item is in at most one selected proposal. If each item must be sold, then the inequality in (7) should be changed to an equality. To prevent infeasibility, and to also represent a minimum value for each item, one can include a dummy player and a dummy proposal for each individual item. Constraints (8) enforces integrality on the decision variables. Although this formulation may potentially have far more decision variables than the original formulation, our computational experience with this new formulation indicates that for moderate size problems it can be solved with less computation and less computer memory than the amount required for the original formulation. This faster computation time is due in part to the fact that all of the constraints have the same structure (sum of a set of variables is less than or equal to 1), and that the variables partition naturally in to sets of variables associated with each player. This partition, into so-called "special ordered sets" can be taken advantage of in commercial integer programming software.

We can write the integer programming formulation in standard notation by constructing a matrix A which has a row for each player p∈P, a row for each item i∈I, and a column for each proposal C∈Φ. In the row corresponding to player p the matrix element in column C, denoted $a_{p,C}$, is set equal to 1 if $C \in \Phi_C$ and is set equal to 0 otherwise. In the row corresponding to item i the matrix element in column C, denoted $a_{i,C}$, is set equal to 1 if $i \in S_C$ and is set equal to 0 otherwise. The matrix A has relatively few rows, one for each item and one for each player, but can, for auctions in which each player bids on many different combinations of items, have a large number of columns. We let w be the row vector of proposal values, and let e be a column vector of 1's. In this standard notation, the integer program is written as $$\text{Max } wz$$
$$\text{Subject to } Az \leq e$$
$$z \in \{0, 1\}^\Phi$$

In addition to computation speed for moderate sized problems, this new formulation has a second advantage. For very large problems, with many items and many bidders, "column generation techniques" which have been used in the Operations Research profession for several decades, can be effectively applied. For details on the column generation technique, see Optimization Theory for Large Systems, Leon S. Lasdon, 1970, MacMillan Publishing, pp, 146–148. In brief, column generation is used to solve mathematical optimization problems, including integer programming problems, when the number of columns in the constraint matrix is very large. When the constraint matrix A of a linear programming or integer programming problem has a very large number of columns it is possible to solve the problem by considering only a subset of columns, solving the "restricted problem" that contains only those columns, using the dual variables corresponding to the linear programming solution (which are produced by most commercial linear programming software) to adjust the prices of the remaining columns, and to determine which of the remaining columns can, if added to the smaller problem, result in an improvement in the objective function. If no columns can possibly improve the objective function, then the current solution is optimal and the remaining columns do not need to be considered. Otherwise some of the columns that can improve the objective function are added to the formulation, resulting in a somewhat larger (but typically still tractable) restricted problem. This process is repeated as long as columns that can improve the objection function can be found. The proof that column generation techniques produce optimal solutions is based on the concept of linear programming duality, which is covered in most linear programming text books and is not discussed here.

It is important to note that the column generation approach works even when the columns of the matrix are not explicitly given, so long as the set of columns has a well defined structure and new columns can be easily identified. For our formulation, columns correspond to proposals, which have a well defined structure. Furthermore, the dual variables associated with the item constraints (8) can be easily used to adjust the bid values, and the dual variables associated with the player constraints can be used to determine a threshold on the adjusted value of a proposal. Proposals are added to the restricted problem only if their adjusted value exceeds the threshold for the corresponding player.

DETAILED DESCRIPTION OF A PREFERRED EMBODIMENT OF THE INVENTION

Referring to the drawing, and more particularly to FIG. 1, there is shown a schematic diagram (10-28) of a computer implemented system for a combinatorial auction. One or more players participate in the auction. Two or more items are being auctioned. Each player uses a computer interface to interact with the auction. Each player can enter bids, and each player is informed, through the interface of the status of his or her bids. The status of a bid is "SELECTED" if the bid is in the current set of winning bids. Having a bid "SELECTED" is the combinatorial equivalent of having the current high bid in a single item auction. That is, if no additional bids are entered, the "SELECTED" bids will become the "WINNING" bids. However, if additional bids are submitted, or if the value of an existing bid is increased, a "SELECTED" bid may become "UNSELECTED," just as in a single item auction, a current high bid may be displaced by a higher bid. Each player is allowed to edit his or her own bids, although the types of edits may be significantly restricted by the auction rules. In general, we expect that players will be allowed to increase the value of their bids. They may also be allowed to delete items from a bid (without decreasing the bid value) and to designate additional types for a bid. In some auctions, players may also be allowed to withdraw bids, perhaps subject to some penalty. This invention is not concerned with the particular bidding rules of the auction, only with the methods and systems used to select the winning bids.

Depending on the policy of the auction, as embodied in the authorization rules, players may be allowed to view all bids, or to view all winning bids. Viewing all bids is analogous to an open cry auction. The method and system described in this invention are applicable independent of the form of the authorization rules.

Bid data is maintained in a bid table, which is updated by a bid update function. The update function updates the bid table with information received from the players as well as with information received for the auction solver.

The Auction controller determines when the auction solver needs to run by monitoring the data in the bid table, or by receiving messages from the bid update function. The Auction controller also determines whether the solver is idle. In this figure we show only a single solver. For large auctions, with a large number of bidders, or for auction for very high value items, it may be desirable to run multiple solvers. In the first case, the solver run time may be greater than the interval between bid activity, and running multiple solvers can give bidders faster feedback on the status of their bids. In the second case, multiple solvers can be used to increase the confidence that optimal solutions are being obtained, so that the seller's revenue is truly maximized.

Figure 2:
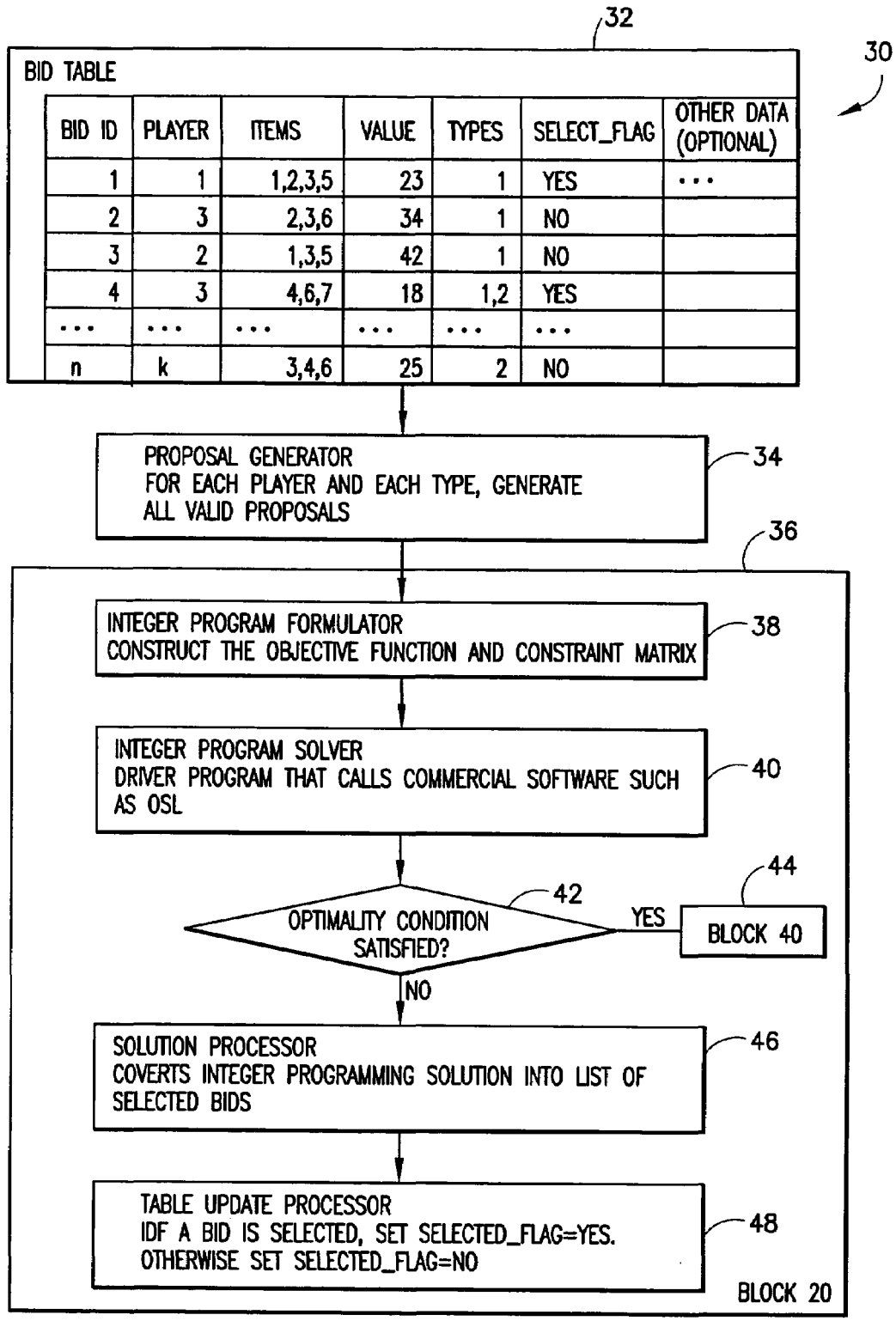
FIG. 2 shows a block diagram of the FIG. 1 system that can determine a winning combination of bids by generating all proposals and solving the resulting integer program.

FIG. 2 (30–48) illustrates the details of the auction solver for moderate sized auctions. The details of the bid table are illustrated by example, although our methods can be applied to other forms of bid data as long as the required elements (bid id, player id, items in the bid, value of the bid, and (if required for the auction) types of the bid) are included.

The proposal generator generates all valid proposals for each player and each type. The use of proposal, and the constraints linking the proposals is a key novel feature of this inventions, as it is this feature that allows for rapid solution of large auctions. The proposals are generated using the method described in the introduction, or any other method for finding all disjoint subsets of a collection of sets, such as the method given by Tsukiyama, Ide, Ariyoshi and Shirakawa in "A New Algorithm for Generating all the Maximal Independent Sets" published in the Siam Journal on Computing, Volume 6, Number 3, September 1977, pages 505–517. This invention is not restricted to either of these methods for generating proposals.

The proposals generated by the proposal generator are then used to construct a constraint matrix and an objective function for a 0–1 integer program. This construction, through the use of proposals, is a key novel element of this invention. The constraint matrix A has a row for each player $p \in P$, a row for each item $i \in I$, and a column for each proposal $C \in \Phi$. In the row corresponding to player p the matrix element in column C, denoted $a_{p,C}$, is set equal to 1 if $C \in \Phi_C$ and is set equal to 0 otherwise. In the row corresponding to item i the matrix element in column C, denoted $a_{i,C}$, is set equal to 1 if $i \in \overline{S}_C$ and is set equal to 0 otherwise. The objective function w specifies a value $w_C$ for each proposal $C \in \Phi$. The value $w_C$ is equal to the sum of the value of the bids in C, and is given by $w_C = \Sigma_{j \in C} v_j$.

The integer program solver makes use of commercial software. In our implementation we used functions included in the IBM product "Optimization Solutions and Library" (OSL), along with some problem specific code to steer the optimization process. Other commercial software for solving integer programs is available, and this invention is not limited to a particular choice of software or to a specific sequence of function calls used to invoke the selected software.

The solution to the integer program is a set of proposals that includes at most one proposal for each player. Since the players interact with the auction through the use of bids, the selected proposals must be translated into a set of selected bids. This step is straightforward. A bid $k \in B$ is selected if and only if there exists a selected proposal $C \in \Phi$ such that $k \in C$. We note that in some implementations, proposals may be represented as sets of items rather than sets of bids (that is a bid is represented by the set $\overline{S}_C$, and the set C is not stored). In this case, it is necessary to reconstruct the selected bids from the selected proposals. The details of this reconstruction are straightforward and are not given here.

The list of winning bids is communicated to the bid data update function, which updates the bid status in the bid data table. If a bid is selected, its selected_flag is set to 1. Otherwise, its selected_flag is set to 0.

Figure 3:
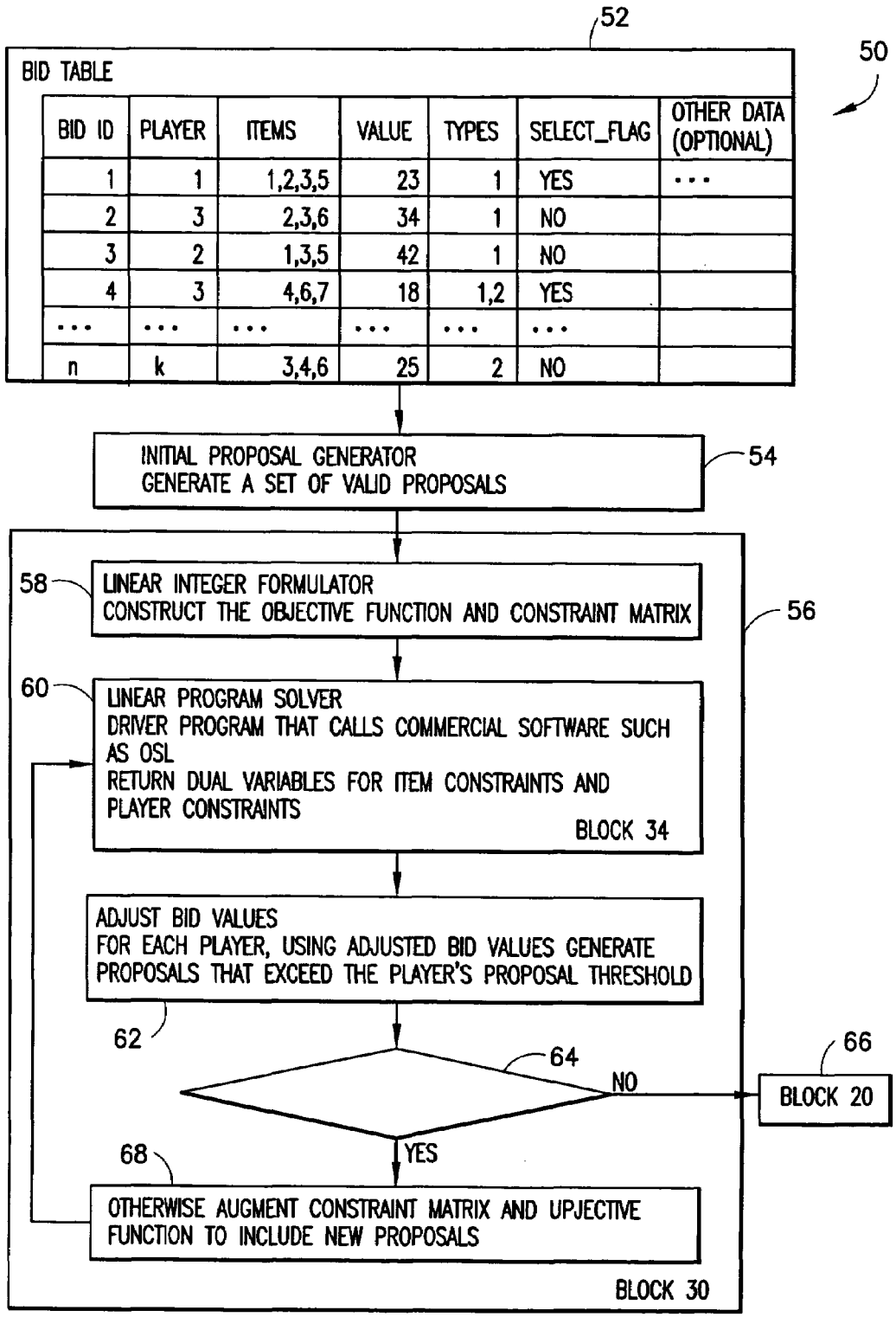
FIG. 3 shows a block diagram of the FIG. 1 system that may be used to solve large problems, in which a subset of proposals are generated, the linear programming relaxation of the resulting integer program is solved, the dual-variables produced by the linear programming package are used to adjust the value of the individual bids, and a proposal generator is run to generate a set of additional proposals that are eligible for inclusion in the winning combination.

In FIG. 3 (52–68) there is shown a flow diagram of the Auction Solver that can be used for large auctions, when the computation time or space required for solving the full formulation is prohibitive. As in FIG. 2, bid data is presented to the solver in a bid data table. This bid data is used to generate an initial set of proposals. The initial set of proposals should, if possible include at least one proposal for each player and at least one proposal for each item. In general, the initial set of proposals should include proposals that are of high value, relative to their contents. If information about the relative value of each item is available, this can be used to select combinations. Otherwise, one can make various estimates for the value of an item based on the value and number of items of each bid that contains the item. For the sake of completeness, we give one estimate here, but note that this invention is not limited to the use of any particular initial estimate of item value. For each item $i \in I$ let $n_i$ be the number of bids that contain i. If $n_i=0$ then there are no bids that contain the item and clearly its value can be estimated to be 0. Otherwise one can estimate the value of i, denoted $\pi_i$ by averaging the value per item ratio of the bids that contain i:

$$\pi_i = \sum_{\substack{k \in B: \\ i \in S_k}} \frac{v_k}{|S_k|} \div n_i$$

Using an estimate for the value of each item, and estimating the "excess" value of a bid to be the value of the bid minus the sum of the estimated value of the items in the bid, we compute "excess values" for each bid as $\hat{v}_k = v_k - \Sigma_{i \in S_k} \pi_i$. Using these values, together with a greedy algorithm or a randomized greedy algorithm, one can quickly compute an initial set of proposals that have high "excess" value. If each item must be sold, then for each item select the bid containing that item that has highest excess value, and add the proposal consisting of only that bid to the set $\Phi$ of proposals. If at least one proposal from each player must be considered, the for each player (or for each player, type combination) then generate the proposal consisting of the bid from that player (or player, type combination) with the highest excess value and add that proposal to $\Phi$. To generate additional high value proposals, consider only the bids with positive excess cost. For each player p and each type t and sort the positive excess value bids in $B_{p,t}$ in order of decreasing excess cost, $l(1), l(2), \ldots l(n)$. Generate the proposal $C=\{l(1)\}$ and add it to the set. For each bid $k=2, \ldots, n$ if $\overline{S}_C \cap S_{l(k)} = \emptyset$, then set $C = C \cup \{l(k)\}$ and add the proposal C to the set $\Phi$. If additional bids are required, a randomized greedy strategy, in which the bids are considered in other orders, or in which eligible bids are added to the proposal according to some probability distribution, can be used.

Once a sufficient number of columns have been generated the objective functions w and the constraint matrix A corresponding to these proposals are constructed. The integer program is formulated. Instead of solving the integer program, we use commercial optimization software to solve only the linear programming relaxation of the integer program. This means that we relax the integrality constraints on the decision variable, and instead of requiring that each decision variable take either the value 0 or the value 1, we allow any value in the range [0,1]. Linear programs are significantly easier to solve than integer programs. Most mathematical optimization software that is capable of solving integer programs can also be used to solve the linear program. In our implementation we use the linear programming solver in OSL. Although the solution returned by the linear programming solver may specify fractional values for some of the decision variables, and thus does not correspond to a set of selected proposals, it provides valuable information in the form of dual variables. There is a dual variable associated with each constraint of the integer program. If an inequality is strictly satisfied, then the dual variable associated with that constraint will have the value 0. If the constraint is strictly satisfied, then the size of the dual variable gives some indication on the relative importance of the constraint. In general, the larger the value of the dual variable, the larger the "marginal value" of the resource represented by the corresponding constraint. For the constraints corresponding to item i, we can use the dual variable $\pi_i$ as an estimate of the value of the item. Using these new estimates, we can again compute the "excess" value of bids. The dual variables $\lambda_p$ associated with the players also play a role in the generation of proposals. Since we can select only one proposal per player, and a large dual variable, would indicate that there are many "good" proposals for that player already being considered, we should give preference to players from whom the dual variable is small. Linear programming theory says that a proposals C for player p can increase the objective function value of the linear programming relaxation of the integer program if and only if $$w_C - \sum_{i \in \overline{S}_C} \pi_i > \lambda_p. \quad (9)$$

Expanding $w_C$ according to its definition, we have $$w_C - \sum_{i \in \overline{S}_C} \pi_i = \sum_{k \in C}\left(v_k - \sum_{i \in S_k} \pi_i\right) = \sum_{k \in C} \tilde{v}_k > \lambda_p. \quad (10)$$

The condition for adding a proposal as written in (10) is in terms of the "excess" value of the bids. Determining whether such a proposal exists for a given player p and type t is equivalent to determining whether there is a disjoint collection of bids in the set $B_{p,t}$ that has total excess value greater than $\lambda_p$. Since the sets $B_{p,t}$ will typically contain a fairly small number of bids, the existence of such a collection can be, if necessary, verified by complete enumeration of the bids having excess value greater than Min($\lambda_p$, 0). Various efficient search strategies can also be used, and in many cases, if such a collection exists it can be quickly found by applying a greedy algorithm.

If a new proposal C is found, it may also be desirable to generate additional proposals that "complete" C, especially if some, or all of the items must be sold. Clearly, since only one proposal per player can be selected, the additional proposals to "complete" C should be for players other than the player p associated with C. Various strategies can be used to generate these additional proposals. A simple strategy would be to increase the excess value of bids from players other than p that do not contain any items in $\overline{S}_C$, and then apply the usual proposal generation strategy. Additionally, computational experience with column generation methods for other large problems has taught us that it is often helpful to add randomly generated columns (in this case, proposals) to the restricted problem. Our invention is not restricted to any particular strategy for generating additional columns.

If no proposals that satisfies (10) exists, then the current set of columns is used to formulate the integer program and the solution process continues as in the case of complete proposal enumeration. If proposals satisfying (10) are found, then the corresponding columns are added to the objective function w and to the constraint matrix A and the process of solving a linear program, adjusting the values, and searching for new proposals continues.

This column generation approach has been successfully used to find very good solutions to a variety of optimization problem arising is diverse industries such as airlines and paper production. The application of a column generation based approach to maximizing revenue in a combinatorial auction is novel.

If all possible columns (in our case, proposals) are generated, then the approach is guaranteed to find the mathematically proven optimal solution. If only a subset of the possible columns are generated, linear programming duality theory proves that the linear programming relaxation of the integer program is solved to optimality. That is, the inclusion of additional columns cannot improve the objective function value of the linear program. However, the fact that there are no additional columns that can improve the linear programming objective function does not imply that there are no additional columns which would improve the integer programming objective function. Hence, although practical computational experience indicates that for very large auctions this approach will produce very good solutions, that is combinations of bids that either maximize, or almost maximize the possible revenue, within reasonable computation time and computer memory, there may be instances in which higher valued combinations of bids exist, but are not found by this approach alone.

In many cases, such as in the early rounds of an auction, it may be sufficient to provide a near optimal solution. However, for the sake of completeness, we suggest several approaches to ensuring that the optimal integer solution is found.

One obvious approach is to use randomization. For example, one could repeat the column generation based approach with several different sets of initial proposals.

A second approach is to use branch-and-bound methods to search for additional columns that could contribute to the integer solution. This techniques is in many ways analogous to the branch-and-bound technique that is used with an integer programming solver, except that it is used for the purpose of identifying additional columns that should be added to the formulation. Typically, a column (proposal) is selected, and two linear programs are solved. In the first linear program, the value of the selected decision variable is set equal to 1. In the second, the value of the selected decision variable is set equal to zero. Most integer programming solvers facilitate the fixing of the value of a variable through special subroutines, and in general, if the solution of a linear program is known, it typically requires little computation to find the solution to the linear program that results from adding an additional constraint or fixing a variable. In traditional branch-and bound, this process is used to find an integer solution, through a combination of enumeration and bounding. In a column generation scheme, once a linear program that has resulted from fixing one or more variables is solved, the dual variables are used in an attempt to generate additional columns for the original linear program.

Figure 4:
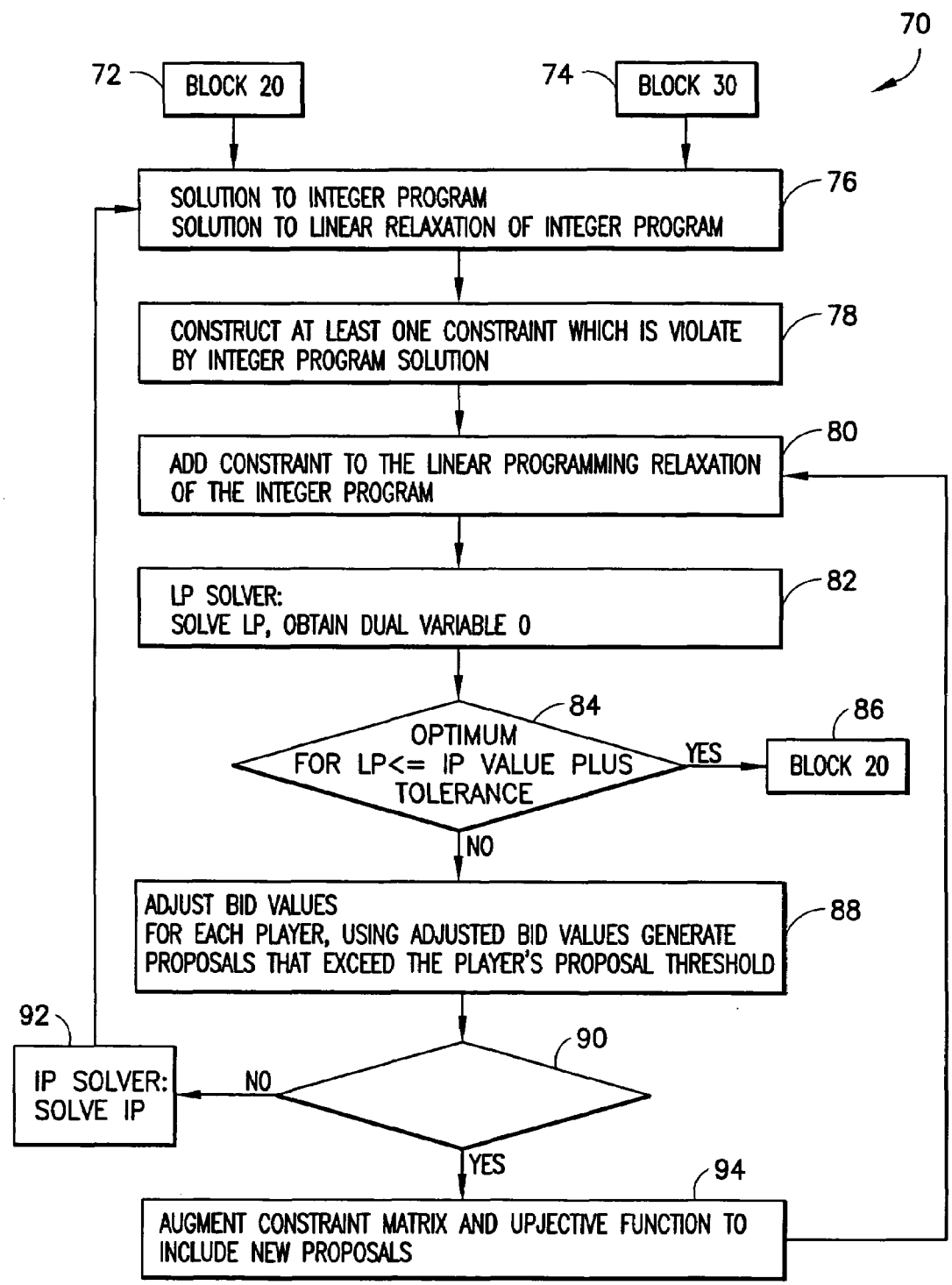
FIG. 4 shows a block diagram illustrating a method by which the optimality of the integer programming solution generated with a limited set of columns can be verified.

A third approach, illustrated in FIG. 4 (70–94) is to solve the IP associated with a set of columns, and then use information about that IP solution to either prove optimality of that solution (for the full set of columns), or to identify additional columns that should be considered. First note that if the solution to the linear program is itself integer, then it is clearly also the solution to the integer program, and represent the set of proposals that maximizes revenue. Also note that the solution to the linear programming relaxation will always be at least as large as the solution to the integer program.

We use the following additional notation. For any matrix A, right-hand side r, and value function d, we let d(A, r) denote the optimal objective function value of the integer program with constraint matrix, matrix A, right-hand side r, and objective function d, and we let z(A, r, d) denote an optimal solution of this integer program. We let $\bar{d}(A, r)$ denote the optimal objective function value of the linear program with constraint matrix, matrix A, right-hand side r, and value function d, and we let $\bar{z}(A, r, d)$ denote an optimal solution of this linear program. Let $\Phi' \subseteq \Phi^0$ be a set of columns in the current matrix such that the optimal integer solution takes the value 1 for all the columns in $\Phi'$. Consider the effect of adding the constraint $$\sum_{C \in \Phi'} z_C \leq |\Phi'| - 1 \qquad (11)$$

to the linear and integer programs. Clearly the integer program optimal solution violates this constraint. If the linear program optimal solution also violates this constraint, then we add the constraint to the formulation of the linear program and resolve. If the linear programming solution does not violate this constraint, we consider another set $\Phi'$ having the desired property.

Adding one constraint results in a slightly larger matrix that has one additional row, and a new right hand side. As done previously, we use the dual solution to this linear program to determine whether there are additional columns that should be added to the linear program. If additional columns are identified, we add them and repeat. We denote the resulting matrix (A, plus one additional row, plus all identified additional columns), to which no additional columns can be added as $A^1$, the right-hand side, which consists of the original right-hand side r and the additional element $|\Phi'|-1$, as $r^1$, and the objective function as $d^1$. If the linear programming solution $\bar{d}^1(A^1, r^1) \leq d(A, r)$, then the integer solution z(A, r, d) is optimal, meaning that there is no set of additional columns that could improve the objective function. Otherwise, we either select a different subset $\Phi'$ and repeat, or solve the integer program having constraint matrix $A^1$, right-hand side $r^1$, and objective function $d^1$ to obtain another integer program solution and repeat.

Adding a constraint of the form (11) above can also be used to check for the existence of a tie, that is two solutions which have the same revenue value.

Figure 5:
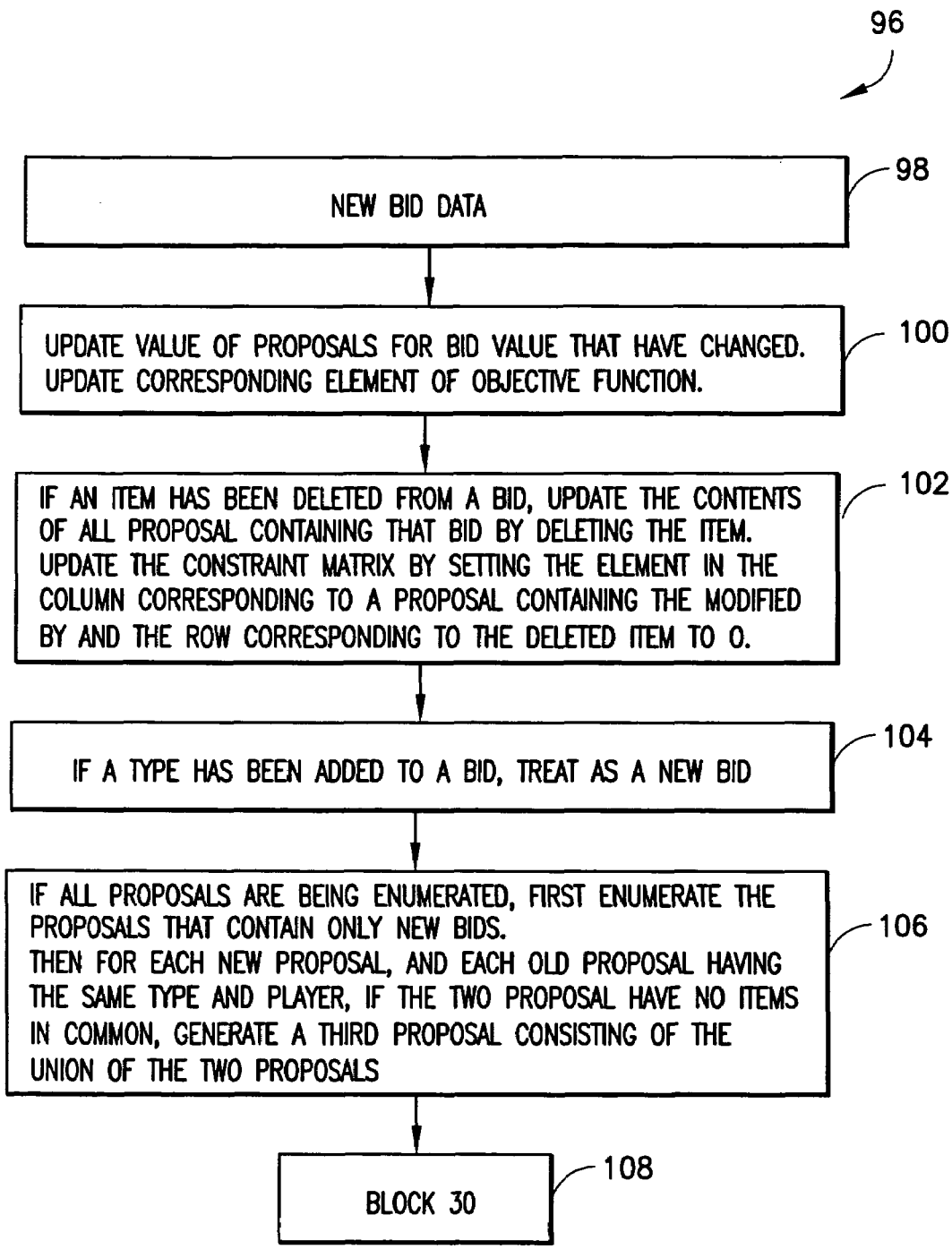
FIG. 5 shows a block diagram showing a a method for updating the optimization problem in response to changes in bid data.

FIG. 5 (96–108) shows the steps that are required to update the optimization model when new bids are entered or existing bids are modified. In general additional bids are easy to deal with. The proposal generation process can be used to determine proposals that contain the new bids. If all proposals are being generated, since all new proposals will contain at least one of the new bids, it is sufficient to generate all valid proposals that contain only new bids, and then to find all pairwise disjoint unions between these new (all new bid) proposals and any existing proposals for that player and types. In the column generation approach, new bids require no special attention, as the column generation procedure will identify proposals containing them.

Edited bids require a bit more work. If the value of a bid is increased, the value of any proposals containing that bid must also be increased. If an item is deleted from a bid, the matrix entry corresponding to that item, in all proposals containing that bid, must be changed from 1 to 0, and in the case of complete enumeration, it is necessary to identify new proposals by checking whether that bid can now be added to any existing proposal. Alternatively, one could simply delete all proposals containing that bid, and treat the revised bid as a new bid. Similarly, if a type is added to a bid, new proposals that include that bid may become possible. In the column generation scheme, the column generator will identify these new proposals as required. In the complete enumeration scheme, it is sufficient to treat the new type as s new bid.

We note that in some cases it may be desirable to delete a proposal, if one can prove that the proposal can never be in an optimal solution. For example, if C, $C_1$, and $C_2$ are proposals from the same player and of the same type and $\bar{S}_C = \bar{S}_{C_1} \cup \bar{S}_{C_2}$ and $w_C < w_{C_1} + w_{C_2}$ then proposal C will never be included in a revenue maximizing solution.

We also note that if the integer program has been preprocessed to generate cutting planes or other constraints that aid in the solution of the integer program, these new constraints will remain valid (but typically become weaker) as new columns are added.

It is understood that the system and method of the present invention can be implemented using a plurality of separate dedicated or programmable integrated or other electronic circuits or devices (e.g., hardwired electronic or logic circuits such as discrete element circuits, or programmable logic devices such as PLDs, PLAs, PALs, or the like). A suitably programmed general purpose computer, e.g., a microprocessor, microcontroller or other processor device (CPU or MPU), either alone or in conjunction with one or more peripheral (e.g., integrated circuit) data and signal processing devices can be used to implement the invention. In general, any device or assembly of devices on which a finite state machine capable of implementing the flow charts shown in the figures can be used to enable the invention.

What is claimed is:

1. A method for executing a combinatorial auction, the method comprising:
   reading input data comprising:
   a plurality of items;
   a player bidding on the items; and
   a plurality of bids, where each bid specifies the player bidding, the amount bid, and the list of items included in the bid;
   generating proposals by utilizing the input data, each said proposal comprising a collection of bids that can be awarded to a player participating in the auction, said bids being actual bids made and being considered simultaneously;

selecting a set of proposals such that each item is included in at most one selected proposal; and informing the players bidding on the items of the result of said selecting a set of proposals.

2. A method according to claim 1, wherein said reading input data comprises reading input data further including at least one type that is specified for each bid, and wherein said generating proposals are limited to collections of bids from a player that are of the same type, and wherein said selecting a set of proposals is limited to sets that include at most one proposal for each player.

3. A method according to claim 1, wherein said generating proposals comprises generating all possible proposals.

4. A method according to claim 1, wherein said selecting a set of proposals is enabled by using an integer programming technique.

5. A method according to claim 1, wherein said selecting a set of proposals comprises selecting a set of proposals that maximizes the total value of the bids included in the selected proposals.

6. The method of claim 1, wherein:

said selecting a set of proposals comprises constructing a constraint matrix, wherein the matrix has a row for each player, a row for each item, and a column for each of the proposals;

formulating an integer program from the matrix;

solving the integer program with a subset of proposals from the matrix;

creating a new proposals subset by adding proposals to the proposal subset if adding proposals to the subset will optimize the solution;

solving the integer program using the new proposal subset;

repeating the adding of proposals and the solving of the integer program until an optimal solution is determined.

7. The method of claim 6, wherein said adding proposals to the proposal subset comprises using a proposal generation to generate the addition proposals until an optimal solution to the integer program is determined.

8. A method for selecting a set of bids in a combinatorial auction for at least two items involving at least one player and at least one type of bid for each player such that:

(a) each item is contained in at most one (or exactly one) selected bid;

(b) for each player, the selected bids all belong to the same type;

and among all collections of bids satisfying (a) and (b) the selected bids maximizing total revenue, said method comprising:

generating all valid proposals, said proposals comprising a collection of bids that can be awarded to a player participating in the auction, said bids being actual bids made and being considered simultaneously;

formulating an integer program that includes a column for each proposal, a constraint for each item and a constraint for each player, said constraints representing conditions (a) and (b) respectively, and an objective function which represents revenue;

solving the integer program for selecting the set of proposals that maximizes revenue; and constructing a set of winning bids from the set of winning proposals.

9. A method according to claim 8, further comprising checking for ties by adding a constraint.

10. The method of claim 8, wherein said solving the integer program comprises solving the integer program with a subset of proposals, said method further comprising:

creating a new proposals subset by adding proposals to the proposal subset if adding proposals to the subset will optimize the solution;

solving the integer program using the new proposal subset;

repeating the adding of proposals and the solving of the integer program and until an optimal solution is determined.

11. The method of claim 10, wherein said adding proposals to the proposal subset comprises using proposal generation methods to generate the addition proposals until an optimal solution to the integer program is determined.

12. The method according to claim 8, wherein:

the subsets of new proposals obey the constraints within the integer program.

13. A method for selecting a set of bids in a combinational auction for at least two items involving at least one player and at least one type of bid for each player such that (a) each item is contained in at most one (or exactly one) selected bid;

(b) for each player, the selected bids all belong to the same type;

and among all collection of bids satisfying (a) and (b) the selected bids maximized total revenue, said method comprising:

generating a set of valid proposals, each said proposal comprising a collection of bids that can be awarded to a player participating in the auction, said bids being actual bids made and being considered simultaneously;

formulating an integer program that includes a column for each proposal, a constraint for each item and a constraint for each player, said constraint representing conditions (a) and (b) respectively, and an objective function which represents revenue;

solving a linear programming relaxation of the integer program in said formulating an integer program for obtaining dual variables associated with each of the constrains;

using dual variables obtained in said solving a linear programming relaxation for determining the excess value associated with each bid, and a threshold for each player;

using a proposal generation method for selecting each player and type, a proposal for which the excess value exceeds the threshold, or determining that no such proposal exists;

adding the proposal generated in said using a proposal generation method and repeating said solving a linear programming relaxation, said using dual variables, and said using a proposal generation method until no new proposals are identified;

solving the integer program that includes all identified proposals; and constructing a set of winning bids from the set of winning proposals.

14. The method of claim 13, wherein the using of a proposal generation method comprises adding randomly generated proposals to the integer program.

15. The method of claim 8, wherein the using of a proposal generation method comprises using a branch-and-bound method to search for additional proposals which, if added to the integer program, will optimize the solution.

16. A program storage device readable by a machine, tangibly embodying a program of instructions executable by the machine to perform method steps for executing a combinatorial auction, said method steps comprising:

reading input data comprising:
        a plurality of items;
        a player bidding on the items; and
        a plurality of bids, where each bid specifies the player bidding, the amount bid, and the list of items included in the bid;
    generating proposals by utilizing the input data, each said proposal comprising a collection of bids that can be awarded to a player participating in the auction, said bids being actual bids made and being considered simultaneously;
    selecting a set of proposals such that each item is included in at most one selected proposal; and
    informing the players bidding on the items of the result of said selecting a set of proposals.

17. The program storage device of claim 16, wherein the generating of a set of proposals comprises constructing a constraint matrix, wherein the matrix has a row for each player, a row for each item, and a column for each of the proposals, said device further comprising:

formulating an integer program from the matrix;
    solving the integer program with a subset of proposals from the matrix;
    creating a new proposals subset by adding proposals to the proposal subset if adding proposals to the subset will optimize the solution;
    solving the integer program using the new proposal subset; and
    repeating the steps of adding proposals and solving the integer program and until an optimal solution is determined.

18. The program storage device of claim 17, wherein:

step (2) for generating proposals comprises adding randomly generated proposals to the integer program.

19. A computer comprising:

(1) means for reading input data comprising:
    a plurality of items;
    a player bidding on the items; and
    a plurality of bids, where each bid specifies the player bidding, the amount bid, and the list of items included in the bid;

(2) means for generating proposals by utilizing the input data, each said proposal comprising a collection of bids that can be awarded to a player participating in the auction, said bids being actual bids made and being considered simultaneously, (3) means for selecting a set of proposals such that each item is included in at most one selected proposal;

(4) means for informing the players bidding on the items of the results in said means for selecting.

20. The computer of claim 19, wherein:

means for generating a set of proposals comprises creating a new proposals subset by adding proposals to the proposal subset if adding proposals to the subset will optimize the means for selecting a set of proposals.

* * * * *